United States Patent
Li et al.

(10) Patent No.: US 12,105,307 B2
(45) Date of Patent: Oct. 1, 2024

(54) LIGHT REFLECTING MATERIAL, REFLECTING LAYER AND PREPARATION METHOD THEREFOR

(71) Applicant: APPOTRONICS CORPORATION LIMITED, Guangdong (CN)

(72) Inventors: Qian Li, Shenzhen (CN); Yusan Chen, Shenzhen (CN); Yangang Wang, Shenzhen (CN); Yanzheng Xu, Shenzhen (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 861 days.

(21) Appl. No.: 17/279,975

(22) PCT Filed: Aug. 14, 2019

(86) PCT No.: PCT/CN2019/100479
§ 371 (c)(1),
(2) Date: Jul. 28, 2021

(87) PCT Pub. No.: WO2020/063154
PCT Pub. Date: Apr. 2, 2020

(65) Prior Publication Data
US 2021/0389512 A1    Dec. 16, 2021

(30) Foreign Application Priority Data
Sep. 25, 2018 (CN) .......................... 201811114796.8

(51) Int. Cl.
G02B 5/02    (2006.01)
C03C 11/00    (2006.01)
(Continued)

(52) U.S. Cl.
CPC ............ *G02B 5/0278* (2013.01); *C03C 11/00* (2013.01); *G02B 5/0242* (2013.01); *B82Y 20/00* (2013.01);
(Continued)

(58) Field of Classification Search
CPC .... G02B 5/2042; G02B 5/0278; C03C 12/00; C03C 11/00
See application file for complete search history.

(56) References Cited

U.S. PATENT DOCUMENTS

2014/0178643 A1    6/2014    Hosokawa et al.
2017/0261657 A1    9/2017    Abe et al.

FOREIGN PATENT DOCUMENTS

CN    101416078    4/2009
CN    101872028    10/2010
(Continued)

OTHER PUBLICATIONS

International Search Report for International Application PCT/CN2019/100479, mailed Nov. 12, 2019.

*Primary Examiner* — Ryan D Howard
(74) *Attorney, Agent, or Firm* — Burris Law, PLLC

(57) ABSTRACT

A light reflecting material, a reflecting layer and a preparation method therefor; the light reflecting material comprises glass powder particles (1), diffuse reflection particles, ultra-fine nano particles and an organic carrier; the particle size of the glass powder particles (1) is ≤5 μm, the particle size of the diffuse reflection particles is 0.1 μm to 0.2 μm, and the particle size of the ultra-fine nano particles is 0.01 μm to 0.05 μm. The glass powder particles (1), diffuse reflection particles and ultra-fine nano particles the particle sizes of which decrease progressively in sequence by one order of magnitude are used as the raw materials of the reflecting layer, without deceasing the adhesion between the reflecting layer and a substrate, the surface area within the reflecting (Continued)

layer that may cause reflection or refraction is increased to obtain better reflectivity.

13 Claims, 3 Drawing Sheets

(51) Int. Cl.
    *B82Y 20/00*     (2011.01)
    *B82Y 30/00*     (2011.01)
    *B82Y 40/00*     (2011.01)
    *G02B 1/00*     (2006.01)

(52) U.S. Cl.
    CPC ............... *B82Y 30/00* (2013.01); *B82Y 40/00* (2013.01); *G02B 1/00* (2013.01); *G02B 2207/107* (2013.01)

(56) References Cited

FOREIGN PATENT DOCUMENTS

| | | |
|---|---|---|
| CN | 103450616 | 12/2013 |
| CN | 104380152 | 2/2015 |
| CN | 106574993 | 4/2017 |
| CN | 107631272 | 1/2018 |
| CN | 107710032 | 2/2018 |
| CN | 207081843 | 3/2018 |
| CN | 110261942 | 9/2019 |
| CN | 110261942 A * | 9/2019 |
| JP | 2014084012 | 1/2017 |
| WO | WO-2019174226 A1 * | 9/2019 |

* cited by examiner

LIGHT REFLECTING MATERIAL, REFLECTING LAYER AND PREPARATION METHOD THEREFOR

TECHNICAL FIELD

The present disclosure relates to a light reflecting material, a reflecting layer and a preparation method therefor, which belong to the technical field of illumination and display.

BACKGROUND

In the prior art, the reflective inorganic light-emitting color wheel is a wavelength conversion device which can be used for high-power laser light source devices, and its performance can directly affect the performance of the laser light sources. In order to improve the emission performance of the inorganic light-emitting color wheel, one of the main routes is to improve the reflecting performance and thermal conductivity of the reflecting layer in the light-emitting color wheel. Since the reflecting layer in the inorganic light-emitting color wheel is a porous structure, increasing the reflective surface area in the porous structure, thinning the pores and reducing the thickness are the main routes to improve the reflective performance and thermal conductivity.

The glass powder is a powder made by crushing and grinding an integral piece of glass block. Since the glass in the glass block is a rigid crystal, a great external shear force (such as ball-milling) is necessary to crush and refine it. The manufacture of glass powder is a process from coarse particles to fine particles. When the powder is refined to a certain extent, such as 1 μm-2 μm, it becomes difficult to apply enough external force to these powders (if large balls are used for ball-milling, the contact area under force is too small, and many powder particles can hardly bear force; while if small microspheres are used, the shear force is too small), so it is difficult to make the minimum particle size of glass powders less than 1 μm. Diffuser particles, such as $Al_2O_3$, $TiO_2$ and other powders, can be prepared by chemical synthesis. By controlling the speed of synthesis and precipitation, powder particles with different sizes and shapes can be prepared. At present, commercial powders can reach the ultrafine powder level of 10 nm-30 nm.

When the glass powder and the diffuser particles are used to prepare the reflecting layer, the contents of the diffuser particles and the glass powder will significantly affect the performance of the reflecting layer: in order to obtain sufficiently high reflectivity, enough diffuser particles are needed to obtain enough reflective surface; in order to ensure that the internal structure of the reflecting layer is continuous and compact, and that the reflecting layer can effectively adhere to a substrate, a sufficient amount of the glass powder is needed. However, the higher the content of reflecting particles, the more difficult it is for the glass phase to become a continuous structure as the objects to which the reflecting particles adheres are in a lack, and the reflecting layer will become looser, easy to fall off, and have worse thermal conductivity. The higher the glass powder content, the lower the reflectivity of the reflecting layer is due to the reduction of reflecting particles. That is, these two factors are contradictory.

In addition, due to the limitation of processing technology, it is difficult to disperse finer particles in the slurry of glass powder+diffuser particles+organic carrier, because this slurry is usually very viscous. After an ultrafine nano powder is added, due to the large specific surface area and large surface energy of the ultrafine nano powder, the organic carrier cannot effectively drive away the air on the surface of the ultrafine nano-powder, which will cause an increase of bubbles in the slurry and difficulties in mixing. On the other hand, when a large amount of ultrafine nano powder is added, it will also affect the fluidity and interconnection of softened glass during sintering.

SUMMARY

In view of the defects of the prior art, the technical problem to be solved by the present disclosure is to provide a light reflecting material, a reflecting layer and a preparation method therefor, which uses glass powder particles, diffuser particles and ultrafine nano particles the particle sizes of which decrease progressively in sequence by one order of magnitude as raw materials of the reflecting layer, to increase the surface area which can cause reflection or refraction in the reflecting layer without reducing the adhesion between the reflecting layer and a substrate, thereby obtaining better reflectivity.

The technical problem to be solved by the present disclosure is realized by the following technical solution:

The present disclosure provides a light reflecting material, including glass powder particles, diffuser particles, ultrafine nano particles and an organic carrier; a particle size of the glass powder particles is ≤5 μm, a particle size of the diffuser particles is 0.1 μm to 0.2 μm, and a particle size of the ultrafine nano particles is 0.01 μm to 0.05 μm.

Preferably, the diffuser particles are $TiO_2$, the ultrafine nano particles are second $Al_2O_3$, and the glass powder particles are selected from the group consisting of silicate glass, lead silicate glass, aluminoborosilicate glass, aluminate glass, soda-lime glass, quartz glass, and combinations thereof.

Preferably, a mass ratio of the diffuser particles, the ultrafine nano particles and the glass powder particles is (1 to 6):(0.3 to 8):(1 to 5).

In order to suppress agglomeration, the diffuser particles further include first $Al_2O_3$, and a mass ratio of the $TiO_2$ to the first $Al_2O_3$ is (1 to 6):(0 to 4).

Preferably, a mass ratio of the first $Al_2O_3$ to the second $Al_2O_3$ is (0 to 4):1.

Preferably, a mass ratio of the $TiO_2$, the first $Al_2O_3$, the second $Al_2O_3$ and the glass powder particles is 3:2:1:4.

The present disclosure further provides a reflecting layer, including ultrafine nano particles, diffuser particles and a glass phase having a reticulated structure, the diffuser particles are attached to a surface of the reticulated structure formed by the glass phase, and the ultrafine nano particles are distributed on the surface of the reticulated structure formed by the glass phase or on a surface of the diffuser particles or in clearances of the reticulated structure.

Preferably, at least part of the ultrafine nano particles is distributed in the clearances of the reticulated structure formed by the glass phase in a form of agglomeration.

Preferably, the diffuser particles are $TiO_2$, the ultrafine nano particles are second $Al_2O_3$, the glass phase is formed by sintering glass powder particles, and the glass powder particles are selected from the group consisting of silicate glass, lead silicate glass, aluminoborosilicate glass, aluminate glass, soda-lime glass, quartz glass, and combinations thereof wherein, a particle size of the $TiO_2$ is 0.1 μm-0.2 μm, and a particle size of the second $Al_2O_3$ is 0.01 μm-0.05 μm.

Preferably, a mass ratio of the $TiO_2$, the second $Al_2O_3$ and the glass powder particles is (1 to 6):(0.3 to 8):(1 to 5).

In order to suppress agglomeration, the diffuser particles further include first $Al_2O_3$, and a mass ratio of the $TiO_2$ to the first $Al_2O_3$ is (1 to 6):(0 to 4).

The present disclosure further provides a preparation method of a reflecting layer, the preparation method including:

S11, mixing ultrafine nano particles with an organic carrier and then ball-milling to form a first slurry;

S12: adding glass powder particles into the first slurry and then ball-milling to form a second slurry;

S13, adding diffuser particles into the second slurry and then ball-milling to form a reflecting slurry;

S14: brushing the reflecting slurry on a thermally conductive ceramic substrate and drying; and S15, brushing a light-emitting slurry on the dried reflecting slurry and sintering to form a wavelength conversion device consisting of a light-emitting layer, a reflecting layer and the thermally conductive ceramic substrate;

wherein, the diffuser particles contain first $Al_2O_3$ and $TiO_2$ with particle sizes of 0.1 μm-0.2 μm, the ultrafine nano particles contain second $Al_2O_3$ with a particle size of 0.01 μm-0.05 μm, and a mass ratio of the $TiO_2$, the first $Al_2O_3$, the second $Al_2O_3$ and the glass powder particles is (1 to 6):(0 to 4):(0.3 to 8):(1 to 5).

The present disclosure further provides a preparation method of a reflecting layer, the preparation method including:

S21: mixing ultrafine nano particles with an organic carrier, and then ball-milling to form a first slurry;

S22: adding glass powder particles into the first slurry, and then ball-milling to form a second slurry;

S23: adding diffuser particles in three batches into the second slurry and ball-milling to form a reflecting slurry;

S24: brushing the reflecting slurry on a thermally conductive ceramic substrate and drying;

S25: sintering the dried reflecting slurry to form a reflecting plate device consisting of a reflecting layer and the thermally conductive ceramic substrate, wherein, the diffuser particles contain $TiO_2$ with a particle size of 0.1-0.2 μm, the ultrafine nano-particles contain second $Al_2O_3$ with a particle size of 0.03 μm, and a mass ratio of the $TiO_2$, the second $Al_2O_3$ and the glass powder particles is 1:1:3.

To sum up, the present disclosure adopts glass powder particles, diffuser particles and ultrafine nano particles the particle sizes of which decrease progressively in sequence by one order of magnitude as the raw materials of the reflecting layer, and increases the surface area in the reflecting layer that can cause reflection or refraction without reducing the adhesion between the reflecting layer and the substrate, thereby obtaining better reflectivity.

The technical solutions of the present disclosure will be described in detail below with reference to the drawings and specific embodiments.

DESCRIPTION OF EMBODIMENTS

Figure 1:
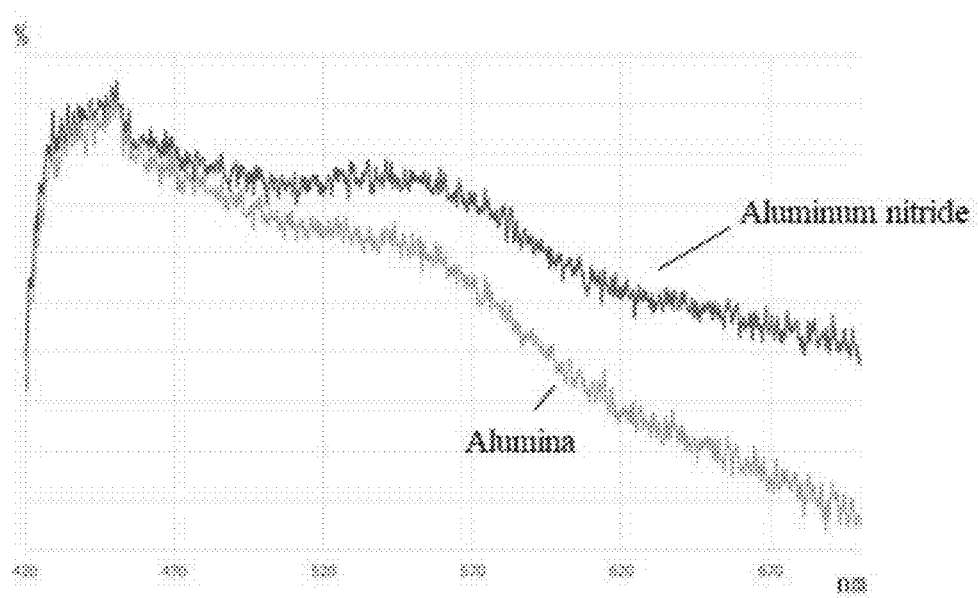
FIG. 1 is a comparative graph of the reflectivity of reflecting layers with different thermally conductive ceramic substrates.

All raw materials of the present disclosure are not particularly limited in their sources, and can be commercially available or prepared according to the conventional method well known to those skilled in the art.

The present disclosure provides a light reflecting material, which includes glass powder particles, diffuser particles, ultrafine nano particles and an organic carrier. The particle size of the glass powder particles is ≤5 μm, preferably the particle size of the glass powder particles is ≤1 μm; the particle size of the diffuser particles is 0.1 μm-0.2 μm; and the particle size of the ultrafine nano particles is 0.01 μm-0.05 μm.

The glass powder particles can be selected from the group consisting of silicate glass, lead silicate glass, aluminoborosilicate glass, aluminate glass, soda-lime glass, quartz glass, and combinations thereof with different softening points, and silicate glass is preferred because of its low expansion coefficient. The refractive index of the glass powder particles can be selected from various refractive indexes of existing commercial glass powders.

The diffuser particles can be selected from the group consisting of $TiO_2$, $BaSO_4$, $Y_2O_3$, $ZrO_2$, ZnO, etc. and combinations thereof, preferably $TiO_2$ with a particle size of 0.1-0.2 μm. It should be noted that when all of the diffuser particles are $TiO_2$, $TiO_2$ is prone to agglomerate and can hardly disperse during sintering, which hinders the interconnection between sintered glass phases, and the thermal conductivity and adhesion of the sintered product will be affected.

In order to solve the above problems, the diffuser particles may further contain first $Al_2O_3$ with a particle size of 0.1 μm-0.2 μm. According to the resistive dispersion principle, the addition of the first $Al_2O_3$ can effectively inhibit the agglomeration phenomenon.

Various types of ultrafine nano particles can be used for the ultrafine nano particles, and the currently tested results show that $Al_2O_3$ particles have the most stable performance, that is, the ultrafine nano particles are preferably the second $Al_2O_3$ with a particle size of 0.01 μm-0.05 μm.

In the present disclosure, when the diffuser particles are $TiO_2$, the mass ratio of the diffuser particles, the ultrafine nano particles and the glass powder particles is (1 to 6):(0.3 to 8):(1 to 5); and when the diffuser particles further contain first $Al_2O_3$, the mass ratio of the $TiO_2$ to the first $Al_2O_3$ is (1 to 6):(0 to 4). Preferably, the mass ratio of the first $Al_2O_3$ to the second $Al_2O_3$ is (0 to 4):1, and more preferably, the mass ratio of the $TiO_2$, the first $Al_2O_3$, the second $Al_2O_3$ and the glass powder particles is 3:2:1:4.

The organic carrier is selected from terpineol, and ethyl cellulose systems.

The light reflecting material can form a reflecting layer after sintering. Specifically, the light reflecting material can be brushed on the thermally conductive ceramic substrate and sintered to serve as a reflective structural member, and the light reflecting material forms a reflecting layer of the reflective structural member. Further, a fluorescent powder slurry may be then brushed on the reflective structural member and serve as a reflective fluorescent structure (fixed and rotary) after sintering. Experiments show that the reflecting layer can produce efficient reflection effect on blue laser light, fluorescence excited by laser light and other light with various wavelengths. Therefore, the light reflecting material can be used to prepare an ultra-thin diffuse reflecting layer, a reflecting layer of a fluorescent color wheel, a reflecting plate of blue laser and other structural members.

The material of the thermally conductive ceramic substrate is $Al_2O_3$, AlN, sapphire, SiC or SiN. Considering the matching of expansion coefficient and the requirement of heat conduction, an AlN thermally conductive ceramic substrate is preferred in the present disclosure. It should be noted that the selection of the material of the thermally conductive ceramic substrate will affect the reflectivity of the reflecting layer formed by the light reflecting material. FIG. 1 is a comparative graph of the reflectivity of reflecting layers with different thermally conductive ceramic substrates. The reflectivity of reflecting layers with different thermally conductive ceramic substrates is measured by a spectrophotometer. The horizontal axis denotes the wavelength of light, and the vertical axis denotes the reflectivity percentage. Because $Al_2O_3$ thermally conductive ceramic substrate can reflect back part of the long-wavelength light that transmits through the reflecting layer, its overall reflectivity is slightly higher than that of the AlN aluminum nitride thermally conductive ceramic substrate. Therefore, if the thermal conduction load is not large and the matching of the expansion coefficient is acceptable, the reflectivity of the reflective structural member can be improved by selecting an $Al_2O_3$ thermally conductive ceramic substrate.

Figure 2:
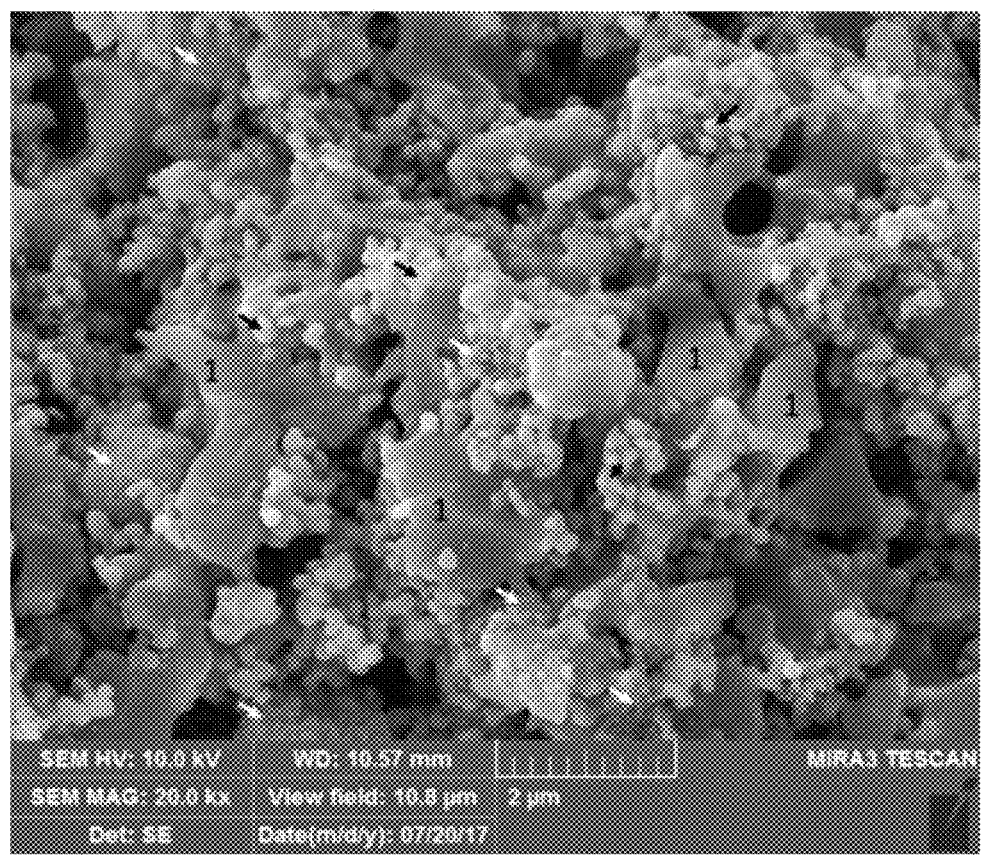
FIG. 2 is a microstructural diagram of the reflecting layer of the present disclosure.

FIG. 2 is a microstructural diagram of the reflecting layer of the present disclosure. As shown in FIG. 2, the reflecting layer contains ultrafine nano particles, diffuser particles and a glass phase. Specifically, the glass powder particles soften moderately in the sintering process, mutually forming a three-dimensional reticulated and connected glass phase structure, and glass powder particles 1 with the size of 1 μm-2 μm are present in the cross-section of the interconnected glass phase in the reticulated structure; the black arrow in the figure refers to diffuser particles with a particle size of 0.1 μm-0.2 μm, and the diffuser particles are attached to the surface of the reticulated structure formed by the glass phase; the white arrow refers to ultrafine nano particles, a small part of the ultrafine nano particles is directly dispersed on the surface of the glass phase or the surface of the diffuser particles, and most of the ultrafine nano particles are distributed in the clearances between the reticulated structures formed by the glass phase in a form of agglomeration of small clusters, that is, the ultrafine nano particles dispersed on the surface of glass phase and the surface of the diffuser particles are fewer than the ultrafine nano particles in the clearances.

When light propagates inside the reflecting layer, it will continue to propagate when encountering the clearances (with air inside) and the bare glass phase surface (via which the light will propagate into the glass phase), and will not be reflected or refracted until it encounters the diffuser particles. Therefore, the more surfaces inside the reflecting layer that can cause reflection or refraction, the higher the reflectivity will be. That is to say, although the thickness of the reflecting layer can affect the reflectivity, what really determines the reflectivity is the surface area and distribution inside the reflecting layer that can cause reflection or refraction. Specifically, the experiment shows that when the thickness of the reflecting layer is reduced from 80 μm to 40 μm, the reflectivity loss is only 2%. However, when the content of the diffuser particles is higher and higher, the reflectivity remains high even after the thickness of the reflecting layer is reduced to 10 μm-20 μm. The inner structure of the reflecting layer with the above structure is more compact with smaller clearances, more reflective/refractive surfaces are formed by the diffuse reflecting particles, and the reflectivity is therefore increased. Moreover, due to the uniform distribution of the glass phase, the adhesion of the reflecting layer to the thermally conductive ceramic substrate is not affected. By further refining the clearance/pore structure of the reflecting layer, the shielding performance of the diffuser particles on the clearances and the glass phase surface in the reflecting layer structure can be effectively improved. Preferably, the thickness of the reflecting layer in the present disclosure is 30 μm-150 μm.

The present disclosure also provides a preparation method of the reflecting layer, and the preparation method includes:

S11, mixing the ultrafine nano particles with an organic carrier and then ball-milling to form a first slurry;

S12: adding glass powder particles into the first slurry and then ball-milling to form a second slurry;

S13, adding diffuser particles into the second slurry and then ball-milling to form a reflecting slurry;

S14: brushing the reflecting slurry on a thermally conductive ceramic substrate and drying; and S15: brushing a light-emitting slurry on the dried reflecting slurry and sintering to form a wavelength conversion device consisting of a light-emitting layer, a reflecting layer and the thermally conductive ceramic substrate.

Wherein, the diffuser particles contain first $Al_2O_3$ and $TiO_2$ with particle sizes of 0.1 μm-0.2 μm, the ultrafine nano particles contain second $Al_2O_3$ with a particle size of 0.01 μm-0.05 μm, and a mass ratio of the $TiO_2$, the first $Al_2O_3$, the second $Al_2O_3$ and the glass powder particles is (1 to 6):(0 to 4):(0.3 to 8):(1 to 5). Preferably, the thickness of the reflecting layer is 40 μm-80 μm.

The reflecting layer prepared by the above preparation method is defined as Embodiment 1. Specifically, in Embodiment 1, the diameter of a grinding body (such as zirconia grinding balls) in the ball-milling process is 5 mm-20 mm, and grinding bodies of various sizes can be used for ball-milling. At S11, the time for ball-milling is 4 h-12 h; at S12, the time for the ball-milling is 1 h-2 h; and at S13, the time for the ball-milling is 2 h-8 h. At S14, the temperature for the drying is 80° C.-150° C., and the time for the drying is 10 min-45 min. After drying, the surface of the reflecting slurry is flat without cracking, and the powder particles on the surface will not peel off or fall off. Preferably, the reflecting slurry is brushed into a ring shape, so that the sintered wavelength conversion device is a fluorescent color wheel. At S15, sintering can be carried out in a muffle furnace under the conditions such as normal pressure, vacuum, and protective atmosphere as required, the sintering temperature can be adjusted in the range of 450° C.-1200° C. according to different glass powders, and an annealing treatment can be carried out at a temperature in a range of 300° C.-800° C. during the cooling process to eliminate the internal stress within and between the structural layers. The light-emitting slurry includes fluorescent powder particles, glass powder particles and an organic carrier, and the fluorescent powder particles use various commercial LuAG and YAG fluorescent powders.

In the preparation method, the ultrafine nano particles are mixed with the organic carrier and then ball milled, and then the glass powder particles and the diffuser particles are added in sequence and then ball-milled respectively, thus avoiding the process step of adding ultrafine nano particles in a viscous slurry and effectively preventing the problem of uneven distribution of the ultrafine nano particles.

The present disclosure further provides another preparation method of the reflecting layer, and the preparation method includes:

S21: mixing ultrafine nano particles with an organic carrier and then ball-milling to form a first slurry;

S22: adding glass powder particles into the first slurry and then ball-milling to form a second slurry;

S23: adding diffuser particles in three batches into the second slurry and ball-milling to form a reflecting slurry;

S24: brushing the reflecting slurry on a thermally conductive ceramic substrate and drying; and S25: sintering the dried reflecting slurry to form a reflecting plate device consisting of a reflecting layer and the thermally conductive ceramic substrate.

Wherein, the diffuser particles contain $TiO_2$ with a particle size of 0.1 μm-0.2 μm, the ultrafine nano particles contain second $Al_2O_3$ with a particle size of 0.03 μm, and the mass ratio of the $TiO_2$, the second $Al_2O_3$ and the glass powder particles is 1:1:3.

The reflecting layer prepared by the above preparation method is defined as Embodiment 2. Specifically, in Embodiment 2, the diameter of the grinding body (such as zirconia grinding balls) in the ball-milling process is 5 μm-20 μm, and grinding bodies of various sizes can be used for the ball-milling. At S21, the time for the ball-milling is 4 h-24 h; at S22, the time for the ball-milling is 1 h-4 h; and at S23, the time for the ball-milling is 2 h-8 h. At S24, the temperature for the drying is 80° C.-150° C., and the time for the drying is 10 min-45 min. After drying, the surface of the reflecting slurry is flat without cracking, and the powder particles on the surface will not peel off or fall off. Preferably, the reflecting slurry is printed on a square thermally conductive ceramic substrate by screen printing. At S25, the sintering can be carried out in a muffle furnace under the conditions such as normal pressure, vacuum, protective atmosphere, etc. as required, and the sintering temperature can be adjusted in a range of 450° C.-1200° C. according to different glass powders, and an annealing treatment can be carried out at a temperature in a range of 300° C.-800° C. during the cooling process, so as to eliminate the internal stress within and between the structural layers.

As the reflecting plate device is a total reflection component without the generation of too high heat conduction, and so it is only necessary to consider the reflectivity. Therefore, the material of the thermally conductive ceramic substrate is preferably AlN or $Al_2O_3$, and the thickness of the reflecting layer is preferably 80 μm-150 μm, so as to obtain a higher reflectivity.

It should be noted that the fluorescent color wheel can also be prepared by this method, that is, at S24, the reflecting slurry is brushed into a ring shape, and at S25, a light-emitting slurry is brushed on the dried reflecting slurry and sintered to form a wavelength conversion device consisting of a light-emitting layer, a reflecting layer and the thermally conductive ceramic substrate. At this time, because the content of the second $A_{l2}O_3$ in the reflecting slurry is higher, the reflective effect is better. However, because the adhesion and infiltration of the second $Al_2O_3$ to the glass are poor, if the thickness is too thick, it will be easily affected by the shrinkage of the light-emitting layer and heat dissipation of the light-emitting layer will be also affected. Therefore, the thickness of the reflecting layer of the fluorescent color wheel is preferably 20 μm-40 μm.

Figure 3:
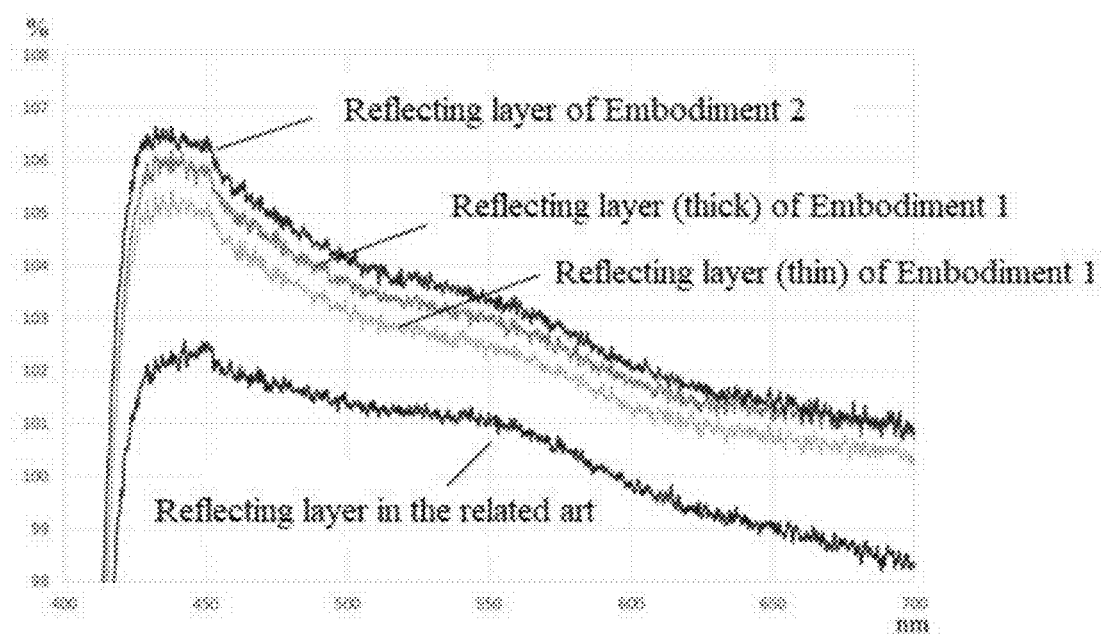
FIG. 3 is a comparative graph of the reflectivity of reflecting layers with different structures.

The reflectivity of the reflecting layers in different structures is measured by a spectrophotometer. FIG. 3 is a comparison graph of the reflectivity of the reflecting layers in different structures. In the figure, the horizontal axis denotes the wavelength of light, and the vertical axis denotes the reflectivity percentage, based on that the reflectivity of white alumina ceramic is 100%. As shown in FIG. 3, the thickness of the reflecting layer in the prior art is 80 μm, a thickness (thick) of the reflecting layer in Embodiment 1 is 80 μm, a thickness (thin) of the reflecting layer in Embodiment 1 is 50 μm, and a thickness of the reflecting layer in Embodiment 2 is 80 μm. It can be seen from the figure that the reflectivity of each of the reflecting layers in the embodiments of the present disclosure is higher than that in the prior art.

To sum up, the present disclosure provides a light reflecting material, a reflecting layer and a preparation method therefor. By using glass powder particles, diffuse reflecting particles and ultrafine nano particles the particle size of which decrease progressively in sequence by one order of magnitude as the raw materials of the reflecting layer, the surface area in the reflecting layer which can cause reflection or refraction is increased without reducing the adhesion between the reflecting layer and the substrate, thereby obtaining better reflectivity.

What is claimed is:

1. A light reflecting material, comprising glass powder particles, diffuser particles, ultrafine nano particles, and an organic carrier, wherein a particle size of the glass powder particles is ≤5 μm, a particle size of the diffuser particles is 0.1 μm-0.2 μm, and a particle size of the ultrafine nano particles is 0.01 μm-0.05 μm.

2. The light reflecting material according to claim 1, wherein the diffuser particles are $TiO_2$, the ultrafine nano particles are second $Al_2O_3$, and the glass powder particles are selected from the group consisting of silicate glass, lead silicate glass, aluminoborosilicate glass, aluminate glass, soda-lime glass, quartz glass, and combinations thereof.

3. The light reflecting material according to claim 2, wherein a mass ratio of the diffuser particles, the ultrafine nano particles and the glass powder particles is (1 to 6):(0.3 to 8):(1 to 5).

4. The light reflecting material according to claim 2, wherein the diffuser particles further comprise first $Al_2O_3$, and a mass ratio of the $TiO_2$ to the first $Al_2O_3$ is (1 to 6):(0 to 4).

5. The light reflecting material according to claim 4, wherein a mass ratio of the first $Al_2O_3$ to the second $Al_2O_3$ is (0 to 4):1.

6. The light reflecting material according to claim 4, wherein a mass ratio of the $TiO_2$, the first $Al_2O_3$, the second $Al_2O_3$ and the glass powder particles is 3:2:1:4.

7. A reflecting layer, comprising ultrafine nano particles, diffuser particles and a glass phase having a reticulated structure, wherein the diffuser particles are attached to a surface of the reticulated structure formed by the glass phase, and the ultrafine nano particles are at least partially distributed on the surface of the reticulated structure formed by the glass phase or on a surface of the diffuser particles or in clearances of the reticulated structure.

8. The reflecting layer according to claim 7, wherein at least part of the ultrafine nano particles are distributed in the clearances of the reticulated structure formed by the glass phase in a form of agglomeration.

9. The reflecting layer according to claim 7, wherein the diffuser particles are $TiO_2$, the ultrafine nano particles are second $Al_2O_3$, the glass phase is formed by sintering glass powder particles, and the glass powder particles are selected from the group consisting of silicate glass, lead silicate glass, aluminoborosilicate glass, aluminate glass, soda-lime glass, quartz glass, and combinations thereof, wherein a particle size of the $TiO_2$ is 0.1 μm-0.2 μm, and a particle size of the second $Al_2O_3$ is 0.01 μm-0.05 μm.

10. The reflecting layer according to claim 9, wherein a mass ratio of the $TiO_2$, the second $Al_2O_3$ and the glass powder particles is (1 to 6):(0.3 to 8):(1 to 5).

11. The reflecting layer according to claim 9, wherein the diffuse reflecting particles further comprise first $Al_2O_3$, and a mass ratio of the $TiO_2$ to the first $Al_2O_3$ is (1 to 6):(0 to 4), and a particle size of the first $Al_2O_3$ is 0.1 μm-0.2 μm.

12. A preparation method of a reflecting layer, the preparation method comprising:
S11, mixing ultrafine nano particles with an organic carrier, and then ball-milling to form a first slurry;
S12: adding glass powder particles into the first slurry, and then ball-milling to form a second slurry;
S13, adding diffuser particles into the second slurry, and then ball-milling to form a reflecting slurry;
S14: brushing the reflecting slurry on a thermally conductive ceramic substrate and drying; and
S15, brushing a light-emitting slurry on the dried reflecting slurry and sintering to form a wavelength conversion device consisting of a light-emitting layer, a reflecting layer and the thermally conductive ceramic substrate, wherein the diffuser particles comprise first $Al_2O_3$ and $TiO_2$ with particle sizes of 0.1 μm-0.2 μm, the ultrafine nano particles comprise second $Al_2O_3$ with a particle size of 0.01 μm-0.05 μm, and a mass ratio of the $TiO_2$, the first $Al_2O_3$, the second $Al_2O_3$ and the glass powder particles is (1 to 6):(0 to 4):(0.3 to 8):(1 to 5).

13. A preparation method of a reflecting layer, the preparation method comprising:
S21: mixing ultrafine nano particles with an organic carrier, and then ball-milling to form a first slurry;
S22: adding glass powder particles into the first slurry, and then ball-milling to form a second slurry;
S23: adding diffuser particles in three batches into the second slurry, and ball-milling to form a reflecting slurry;
S24: brushing the reflecting slurry on a thermally conductive ceramic substrate and drying; and
S25: sintering the dried reflecting slurry to form a reflecting plate device consisting of a reflecting layer and the thermally conductive ceramic substrate,
wherein the diffuser particles comprise $TiO_2$ with a particle size of 0.1 μm-0.2 μm, and the ultrafine nano particles comprise second $Al_2O_3$ with a particle size of 0.03 μm, and a mass ratio of the $TiO_2$, the second $Al_2O_3$ and the glass powder particles is 1:1:3.

* * * * *